(No Model.)
F. SCHEFOLD.
ANNEALING OVEN FOR GLASS.
No. 338,880. Patented Mar. 30, 1886.
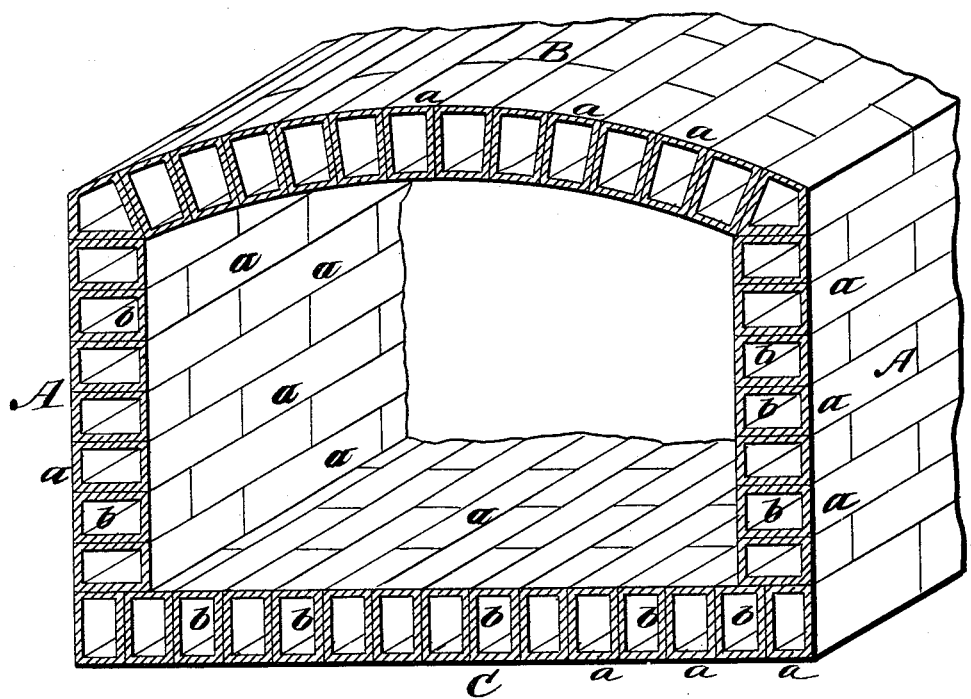
WITNESSES:
F. McArdle.
C. Sedgwick
INVENTOR:
F. Schefold
BY Munn & Co.
ATTORNEYS.

UNITED STATES PATENT OFFICE.

FRANK SCHEFOLD, OF NEW ALBANY, INDIANA.

ANNEALING-OVEN FOR GLASS.

SPECIFICATION forming part of Letters Patent No. 338,880, dated March 30, 1886.

Application filed October 27, 1885. Serial No. 181,057. (No model.)

*To all whom it may concern:*

Be it known that I, FRANK SCHEFOLD, of New Albany, county of Floyd, Indiana, have invented a new and Improved Annealing-Oven for Glass, of which the following is a full, clear, and exact description.

The object of my invention is to provide an oven for annealing glass or glassware which may be heated quickly or cooled quickly to facilitate the process of annealing.

My invention consists in an annealing-oven having hollow walls provided with passages arranged for the circulation of air for the rapid cooling of the oven.

I have shown in the drawing one form of annealing-oven and one method of building the walls thereof; but I do not confine my invention to that particular form, nor to the exact construction of wall there shown.

The walls A A, the top B, and bottom C of the oven are in the present case formed of hollow or tubular bricks *a*, laid end to end and arranged to break joints, and the bricks being open at the ends, when they are built up into the wall they form air-ducts *b*, running longitudinally in the wall.

It is obvious that instead of using hollow bricks in the manner already described I may build the walls of thin flat brick, laying them so as to form air-ducts *b*, which would serve the same purpose as the air-ducts of the hollow bricks.

The inner portions of the walls of a furnace constructed according to my invention, being thin and having a body of air closely confined in contact therewith in the air-ducts *b*, heat very rapidly and admit of bringing the contents of the oven up to the required heat in a much shorter time than that required in an oven having solid walls, thus saving much time at the beginning of the process of annealing, and when the contents of the oven have been nearly or quite annealed the cooling of the oven is hastened by blowing cold air through the ducts *b* with greater or less rapidity.

I am aware that it is not new to construct brick walls with air-flues formed of hollow bricks, and I am also aware that it is common to construct ovens with hollow walls; therefore I do not claim such inventions.

Having thus described my invention, I claim as new and desire to secure by Letters Patent—

An annealing-oven for glass, having its walls, floor, and ceiling composed of a series of hollow bricks, forming a series of longitudinal flues on all sides the furnace, whereby provision is made for heating and cooling the furnace very rapidly, substantially as herein shown and described.

FRANK SCHEFOLD.

Witnesses:
GEO. F. PENN,
JNO. W. LICH.